Oct. 21, 1941.  K. R. MANVILLE  2,259,527
SYNCHRONIZING MECHANISM
Filed May 12, 1938
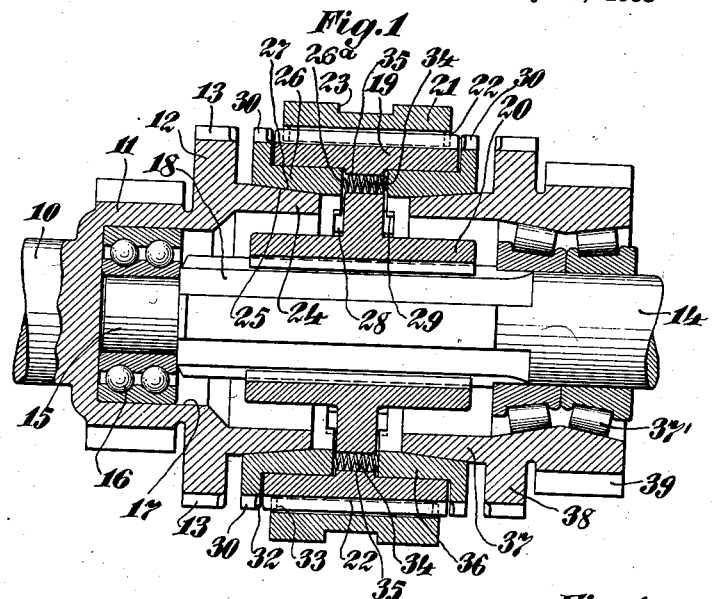
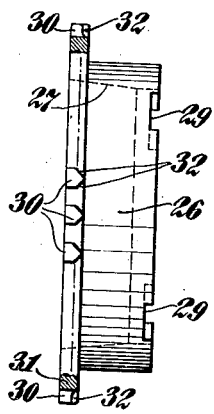
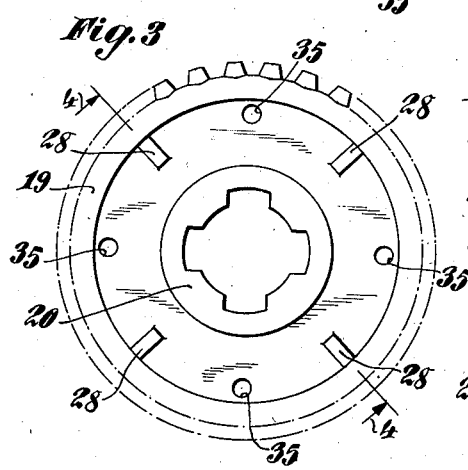
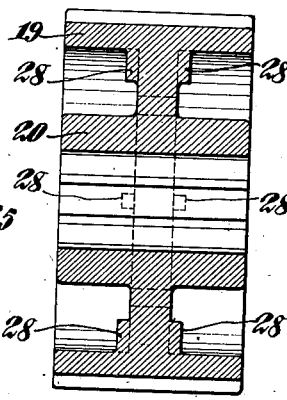
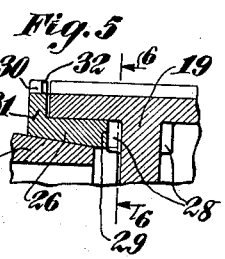
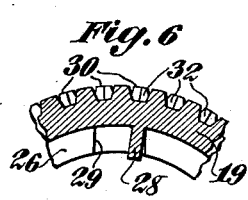
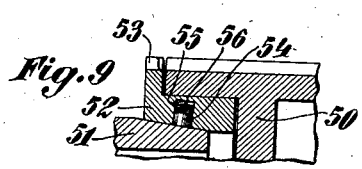
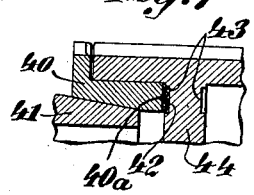
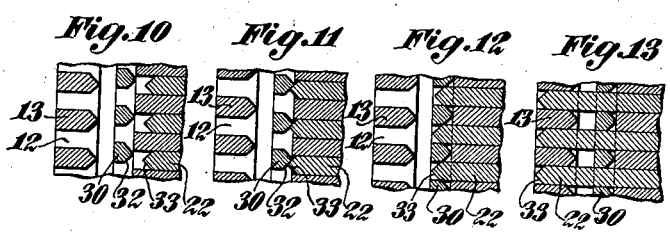
INVENTOR.
Keith R. Manville,
Hoguet, Neary & Campbell,
ATTORNEYS Patented Oct. 21, 1941

2,259,527

UNITED STATES PATENT OFFICE 2,259,527

SYNCHRONIZING MECHANISM

Keith R. Manville, Highland Park, N. J., assignor to Mack Manufacturing Corporation, Long Island City, N. Y., a corporation of Delaware Application May 12, 1938, Serial No. 207,468

6 Claims. (Cl. 192—53)

This invention relates to transmissions and particularly relates to synchronizing devices for facilitating the engagement of the clutch elements of transmissions.

Synchronizing devices for transmissions are well known and generally consist of a pair of toothed clutch elements which are movable into engagement and interposed synchronizing means, generally of the friction clutch type, for bringing the cooperating clutch elements to the same speed of rotation or into synchronism whereby the clutch elements may engage without clashing. Some of these synchronizing devices are provided with balking or blocking mechanisms which prevent movement of the clutch elements into engagement except when the clutch elements are rotating at the same speed. These blocking devices may consist of members having inclined leading edges which cooperate with similar members associated with the shiftable clutch element to block movement of the shiftable clutch element when the clutch elements are not rotating at the same speed. When, due to engagement of the synchronizing mechanisms, the clutch elements are brought to the same speed of rotation, continued pressure of the shiftable clutch element on the inclined faces of the blocking members will cause the blocking member to move and allow the clutch members to move into mesh or engagement.

Devices of the type described above are arranged so that the synchronizing members normally are out of engagement but are shifted into frictional engagement upon shifting movement of one of the clutch elements and upon engagement are rotated into blocking position. In order to produce the initial movement of the synchronizing mechanism, it is necessary to provide a flexible or disengageable coupling between the shiftable clutch element and the synchronizing and blocking elements which causes them to move together until the synchronizing members engage and thereafter allows the shiftable clutch element to move independently of the synchronizing element and blocking means. The disengageable connection introduces a resistance to movement of the shiftable clutch element and likewise increases the inertia of the entire device, thereby rendering shifting and engagement of the clutch elements more difficult and requiring a greater expenditure of effort to clutch or bring into engagement the clutch elements.

An object of this invention is to provide a mechanism for synchronizing the movement of the clutch elements of a transmission to facilitate their engagement and which is continually set to prevent engagement of the clutch elements except while the clutch elements are synchronized.

Another object of the invention is to provide a mechanism for synchronizing the cooperating clutch elements of a transmission to facilitate their engagement and for preventing engagement of the clutch elements when they are not synchronized, and which is preset to prevent engagement of the clutch elements independently of any movement of the clutch elements into engagement.

Other objects of the invention will become apparent from the description of typical forms of synchronizing mechanisms embodying the invention.

For a better understanding of the present invention reference may be had to the accompanying drawing, in which:

Figure 1 is a view in section of a typical form of synchronizing and clutching device embodying the present invention;

Figure 2 is a side elevation partly broken away of a rotatable clutch element and blocking means;

Figure 3 is an end view of a toothed wheel on which the shiftable clutch element and the rotatable synchronizing member are mounted;

Figure 4 is a view in section taken on line 4—4 of Figure 3;

Figure 5 is a view in vertical section and partly broken away of the clutch element or the synchronizing element disclosed in Figure 1;

Figure 6 is a view in section taken on line 6—6 of Figure 5;

Figure 7 is a view in section and partly broken away of a modified form of synchronizing mechanism with the shiftable clutch element removed;

Figure 8 is a side view of a spring washer;

Figure 9 is a sectional view of a modified form of device with the shiftable clutch element removed and partly broken away; and Figures 10, 11, 12 and 13 are sectional and diagrammatic views showing the operation of the shiftable clutch and blocking member.

In the form of invention disclosed in Figure 1 the device may consist of a drive shaft 10 having thereon a gear 11 and a clutch element 12 provided with peripheral teeth 13. A cooperating driven shaft 14 is also provided and has a reduced cylindrical end 15 which is received in a roller bearing 16 mounted in a bore or cavity 17 in the drive shaft 10. The driven shaft 14 is provided with splines 18 on which is fixedly mounted a peripheral toothed wheel 19 which has an internal splined sleeve 20 encircling and engaging the driven shaft 14. An annular clutch element 21 having internal teeth 22 is shiftably mounted on the wheel 19 for movement axially of the shafts 10 and 14. The shiftable clutch element is provided with an annular groove 23 which may receive an actuating yoke (not shown) in the usual way, whereby the shiftable clutch element 21 may be moved axially into engagement with the teeth 13 on the clutch element 12.

It will be understood that the construction thus far described may be used in conjunction with the usual countershafting and may be combined with the gearing necessary to produce any desired number of gear ratio changes. This construction is not disclosed because it is well understood in the art. However, it should be understood that when the clutch element 21 is not in engagement with the clutch element 12 the shafts 10 and 14 usually are operating at different speeds.

The clutch element 12 may also be provided with a substantially annular synchronizing member 24 having a conical outer surface 25 which is adapted to engage a complementary synchronizing member 26 having an annular surface 26a and a conical inner face 27. The synchronizing member 26 is supported internally of the wheel 19 and is capable of limited rotation relatively thereto. The extent of rotation of the synchronizing member 26 is controlled by any suitable means such as a plurality of lugs 28 projecting axially of the wheel 19 which are received in notches 29 in the inside edge of the synchronizing member 26, as shown in Figures 2, 3, 5 and 6. The synchronizing member 26 may be provided with one or more blocking teeth 30 which may be arranged singly or in groups around the periphery of a radially projecting flange 31 on the synchronizing member. The flange 31 is of sufficient width to bring the teeth 30 into alignment with the teeth on the wheel 19 and the internal teeth 22 on the shiftable clutch element 21, and are of a proper size to mesh with the teeth on the shiftable clutch element 21. The lugs 28 and notches 29 are so related in size that when the synchronizing member 26 is rotated in either direction to its limit of movement, the blocking teeth 30 are substantially in radial alignment with the teeth 22 on the shiftable clutch element 21, as shown in Figure 10. As shown particularly in Figure 2 and Figures 10 to 13, the teeth 30 are provided with inclined inner ends or surfaces 32 which during shifting of the clutch element 21 cooperate with inclined or V-shaped ends 33 on the clutch teeth 32.

As illustrated particularly in Figure 1, the synchronizing member 26 may be retained continuously in engagement with the synchronizing member 24 by means of a series of light springs 34 which are mounted in the transverse bores 35 in the wheel 19 and which bear against the annular surface 26a of the synchronizing member 26. The opposite ends of the springs 34 bear against and resiliently urge an oppositely disposed synchronizing member 36 into engagement with a complementary synchronizing member 37 which is rotatably mounted by means of roller bearings 37' on the driven shaft 14. The synchronizing member 37 may have associated therewith a peripherally toothed clutch member 38 and an externally toothed gear 39 which may be connected to suitable countershafting to provide a different gear ratio between the drive shaft 10 and the driven shaft 14.

The resilient pressure of the spring 34 normally retains the synchronizing members 26 and 24 and the synchronizing members 36 and 37 in light frictional engagement whereby, upon rotation of the drive shaft or of the gear 39, the synchronizing members 26 and 36 are set in such a position that the teeth 30 thereon are substantially axially aligned with the teeth of the shiftable clutch element 21, as shown in Figure 10. Upon movement of the shiftable clutch element 21 to bring the teeth 22 thereof into engagement with the teeth 30 on the blocking or synchronizing member, the synchronizing members, for example, 24 and 26, are forced more tightly into engagement, as shown in Figure 11, thereby producing a strong lateral component of force which resists axial movement of the shiftable clutch member 21. The increased frictional engagement between the synchronizing members 24 and 26 tends to bring the clutch element 21 into synchronism with the clutch element 12. When the clutch elements 12 and 21 are synchronized the axial pressure exerted by the shiftable clutch element 21 is sufficient to overcome the lateral or rotary component of force exerted on the synchronizing clutch element 26, thereby rotating it sufficiently to allow the teeth 22 to pass between the teeth 30 on the synchronizing element, as shown in Figure 12. Continued movement of the shiftable clutch element 21 causes the teeth 22 on the shiftable clutch element 21 to pass between and engage the teeth 13 on the clutch element 12, thereby coupling the drive shaft to the driven shaft, as shown in Figure 13.

The same series of operation takes place when it is desired to engage the shiftable clutch member 21 with the clutch element 38.

While the synchronizing members are in continuous frictional engagement and there may be considerable slippage therebetween due to the different speeds of operation of the drive and driven shafts, substantial wear and deterioration of the synchronizing members is prevented by the thin film of oil which will be present between the faces of the synchronizing members.

Another form of the invention is disclosed in Figure 7. The construction and operation of this synchronizing mechanism is substantially the same as that described above. The synchronizing members 40 and 41 are maintained in engagement by means of spring washers 42 which are disposed in recesses 43 in the peripherally toothed wheel member 44, which is fixed on the driven shaft. The spring washers bear against the annular surface 40a of the synchronizing member 40 to maintain a light frictional engagement between the synchronizing members 40 and 41, which is sufficient to retain the rotatable synchronizing member 40 in a position to block passage of the shiftable clutch member, not shown, except when the associated clutch elements are operated at the same speed.

In Figure 9 is disclosed another form of the invention which consists of the peripherally toothed wheel member 50 and cooperating synchronizing members 51 and 52, the latter being rotatably and axially shiftably mounted on the wheel member 50 and provided with blocking teeth 53 which are normally disposed substantially in alignment with a shiftable clutch element (not shown). Light frictional engagement between the clutch elements is produced by means of one or more plungers 54 slidably mounted in recesses 55 in the clutch element 52 and urged into engagement with the face of the synchronizing member 51 by means of a light coil spring 56. In this construction sufficient frictional engagement is obtained by contact of the plunger 54 with the face of the synchronizing member 51 to preset the blocking teeth 53 into a position in substantial alignment with the teeth on the shiftable clutch element.

The constructions described above have the advantage that a preliminary movement of the shiftable clutch element is not required to move the teeth on the synchronizing members into a position to block movement of the shiftable clutch member. As a result it is unnecessary to provide a disengageable connection between the shiftable clutch element and the movable synchronizing member which facilitates shifting and likewise reduces the amount of weight or inertia that must be overcome to allow easy synchronization of the clutch elements and shifting.

It will be understood that there can be many modifications made in the construction disclosed above, such as, for example, variation in the structures and mechanisms for promoting the light frictional engagement between the synchronizing members, and therefore the embodiments described above should be considered as illustrative and not as limiting the scope of the following claims.

I claim:

1. In a synchronizing mechanism, the combination of a pair of clutch elements relatively shiftable into and out of power transmitting engagement, a first synchronizing member fixedly connected to one of said clutch elements, a second synchronizing member movably associated with the other clutch element, means on said second synchronizing member movable to positions for blocking and allowing shifting of a clutch element, a friction member movably mounted on one of the synchronizing members, and resilient means urging the friction member into light frictional engagement with the other of the synchronizing members to retain the means on said second synchronizing member in blocking position when the clutch elements are not synchronized.

2. In a synchronizing mechanism, the combination of a pair of clutch elements relatively shiftable into and out of power transmitting engagement, a synchronizing member fixedly connected to one of said clutch elements, another synchronizing member movably associated with the other clutch element, means on said another synchronizing member movable to positions for blocking and allowing shifting of a clutch element, and projecting means mounted on the inner surface portion of the said another synchronizing member in constant frictional engagement with the outer surface portion of the said synchronizing member, resilient means urging the synchronizing members into continuous frictional engagement, both of the aforesaid means cooperating in maintaining said blocking means in blocking position when the clutch elements are not synchronized.

3. In a synchronizing mechanism, the combination of a driving clutch element, a driven clutch element movable into and out of driving engagement with the driving clutch element, a first synchronizing element fixed to said driving clutch element, a second synchronizing element, a loose driving connection between the driven clutch element and the said second synchronizing element comprising a plurality of lugs extending radially from the said driven clutch element, a number of slots in the said second synchronizing element adapted to engage the said lugs and being of greater width than the latter to allow limited movement of the said second synchronizing element in relation to the said driven clutch element to a position for blocking movement of the driven clutch element into driving engagement with the driving clutch element, and means for maintaining a light frictional contact between the said synchronizing elements whereby the said loose driving connection maintains the said second synchronizing element in blocking position except when the clutch elements are synchronized.

4. A synchronizing clutch comprising driving and driven clutch members, one of which is shiftable axially into and out of engagement with the other, each of said members having a toothed clutch face for coacting with the toothed clutch face of the other member, and a friction face for coacting with the friction face of the other member, the friction faces being complementally conoidal and arranged to engage in advance of the toothed clutch faces upon axial shifting of the shiftable member, and one of said members having yielding means normally projecting beyond the friction face thereof to engage the friction face of the other member in advance of the full engagement of the friction faces of both members, said means being yieldingly movable into a position flush with the friction face with which said means is associated as the friction faces of both members are brought into full engagement.

5. A synchronizing clutch comprising driving and driven clutch members, one of which is shiftable axially into and out of engagement with the other, each of said members having a toothed clutch face for coacting with the toothed clutch face of the other member, and a friction face for coacting with the friction face of the other member, the friction faces being complementally conoidal and arranged to engage in advance of the toothed clutch faces upon axial shifting of the shiftable member, and one of said members having a shoe normally projecting beyond the friction face thereof to engage the friction face of the other member in advance of full engagement of the friction faces of both members, yielding means pressing the shoe outwardly beyond the said friction face and operable to permit said shoe to move into a position flush with the friction face with which the shoe is associated as the friction faces of both members are brought into full engagement.

6. A synchronizing clutch comprising driving and driven clutch members, one of which is shiftable axially into and out of engagement with the other, each of said members having a toothed clutch face for coacting with the toothed clutch face of the other member, and a friction face for coacting with the friction face of the other member, the friction faces being complementally conoidal and arranged to engage in advance of the toothed clutch faces upon axial shifting of the shiftable member, and one of said members having a shoe normally projecting beyond the friction face thereof to engage the friction face of the other member in advance of full engagement of the friction faces of both members, yielding means pressing the shoe outwardly beyond the said friction face and operable to permit said shoe to move into a position flush with the friction face with which the shoe is associated as the friction faces of both members are brought into full engagement, said shoe being arranged in a recess opening through the friction face with which it is associated.

KEITH R. MANVILLE.

DISCLAIMER 2,259,527.—*Keith R. Manville*, Highland Park, N. J. SYNCHRONIZING MECHANISM.
Patent dated Oct. 21, 1941. Disclaimer filed Aug. 24, 1945, by the inventor; the assignee, *Mack Manufacturing Corporation*, approving and consenting.

Hereby enters this disclaimer to claim 3 of said patent.

[*Official Gazette September 18, 1945.*]